TELEGRAPH TRANSMISSION SYSTEM

Filed May 10, 1955 2 Sheets-Sheet 1

INVENTOR
J. A. MAHONEY
R. C. Lerry
ATTORNEY

TELEGRAPH TRANSMISSION SYSTEM

Filed May 10, 1955

INVENTOR
J. A. MAHONEY

BY R. C. Perry

ATTORNEY 2,802,050

TELEGRAPH TRANSMISSION SYSTEM

Joseph A. Mahoney, New York, N. Y., assignor to Bell Telephone Laboratories, Incorporated, New York, N. Y., a corporation of New York Application May 10, 1955, Serial No. 507,333

7 Claims. (Cl. 178—59)

This invention relates to telegraph transmission systems, and particularly to self-compensating telegraph transmission lines.

The invention represents an improvement in a self-compensating telegraph transmission system shown in Patent 2,131,870, granted October 4, 1938, to W. W. Cramer.

An object of the invention is to make more efficient use of the signaling or transmitting batteries that are employed in the offices in which telegraph lines terminate.

Alternatively, it may be said that an object of the invention is to permit reliable transmission over longer telegraph lines with existing telegraph batteries.

Transmission systems of the type shown in the Cramer patent have become generally known by the descriptive adjective "polarential." The reason for this is that in a two-way transmission system the potentials supplied to the channel are such that the transmission in one direction is polar and in the other direction is differential. Stated somewhat differently, marking and spacing potentials applied at the terminal which transmits polar signals are equal in magnitude and opposite in polarity, and the marking and spacing potentials applied at the polar receiving terminal are unequal.

For a complete understanding of the invention, and of the manner in which it differs from and has advantages over previously known systems, reference may be had to the following detailed description, to be interpreted in the light of the accompanying drawings in which.

Figure 1:
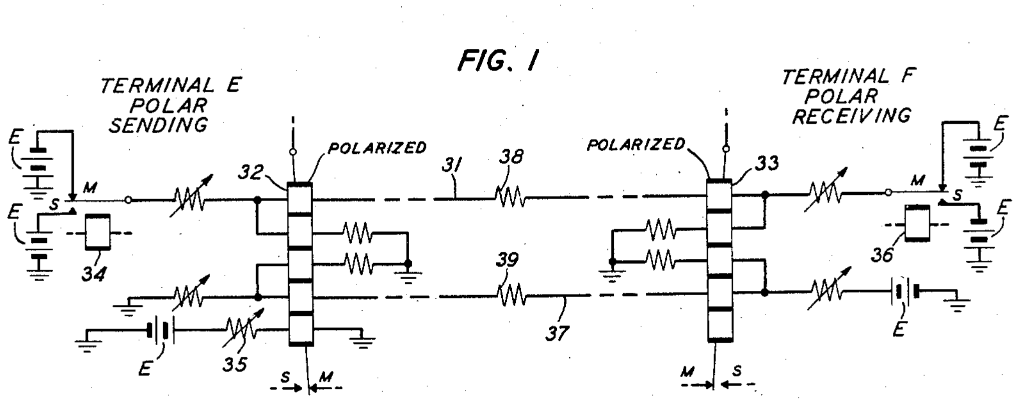
Figs. 1 and 2 are schematic circuit diagrams of two different forms of two-wire polarential telegraph transmission systems according to the present invention.
Figure 2:
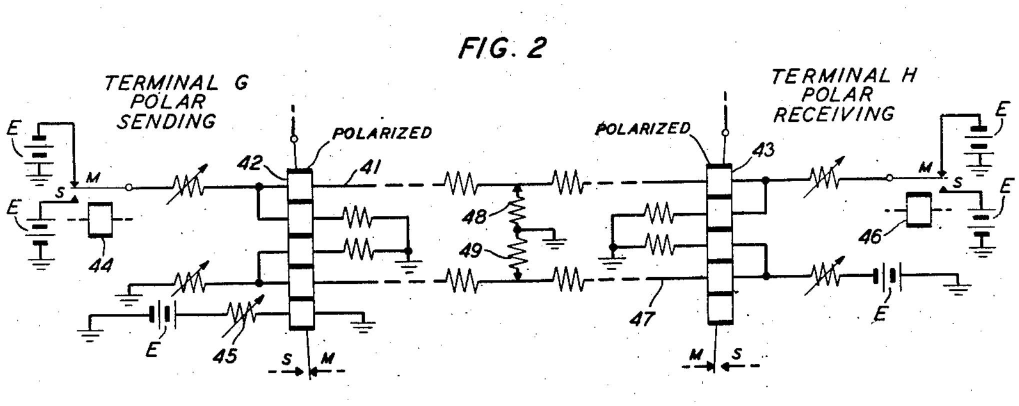
Figure 3:
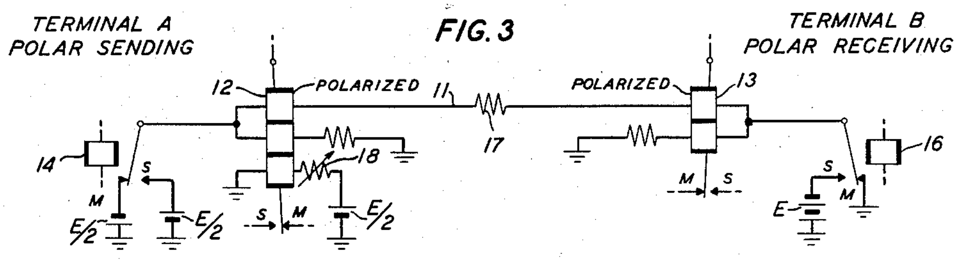
Figs. 3 and 4 are schematic circuit diagrams of corresponding forms of single-wire polarential telegraph systems according to the disclosure of the Cramer patent.

Figs. 5A and 5B, 6A and 6B, 7A and 7B and 8A and 8B are diagrams showing hypothetical combinations of batteries which, according to the well-known principle of superposition, are exactly equivalent to the transmitting potentials for the marking and spacing transmitting conditions at the polar receiving terminal in the arrangements in Figs. 3, 4, 1 and 2, respectively. Referring to the drawings, and particularly to Fig. 3, the reference numeral 11 designates a telegraph line which is connected at its opposite ends through operating windings of polarized receiving relays 12 and 13 to the armatures of transmitting relays 14 and 16, respectively, at terminals A and B, respectively. Relay 14 is operable by any suitable signal source, such as a telegraph key for manual transmission, or a permutation code keyboard or tape transmitter for a teletypewriter system. The marking and spacing contacts of relay 14 at the polar sending terminal A are connected to negative and positive battery, respectively, of equal magnitude, the value of which, in comparison with transmission potentials at the opposite end of the line, will be described hereinafter. The armature of sending relay 14 is also connected through a second winding of receiving relay 12 to ground, and the magnetic effect of the latter winding is opposite to that of the operating winding with respect to potential supplied through the armature of relay 14. This is a well-known arrangement of duplex balance, and is intended to render relay 12 insensitive to signals supplied by the armature of relay 14, while retaining its responsiveness to signals transmitted by the armature of relay 16.

At the opposite end of the transmission line, the sending relay 16 of polar receiving terminal B has its marking contact connected to ground, and its spacing contact connected to negative battery, the magnitudes of which is twice that of either of the batteries connected to the contacts of transmitting relay 14. In order to represent this, the legend E has been applied to the battery connected to the spacing contact of relay 16 and the legend E/2 has been applied to the batteries connected to the contacts of relay 14. Transmitting relay 16 is operable from a signal source capable of transmitting the same type of signals as the signal source that controls relay 14. The armature of relay 16 is connected not only to the operating winding of receiving relay 13, but also through a second winding to ground, in an arrangement similar to the connections of relay 12. Resistor 17 represents, in lumped form, the resistance of line 11.

No connections have been shown to the armatures and marking and spacing contacts of receiving relays 12 and 13, but it will be understood that those relays will control receiving instrumentalities that are compatible with the transmitting instrumentalities. For example, if the latter are manual telegraph keys the devices that the receiving relays control will probably be sounders. On the other hand, if teletypewriter signals are transmitted over the system, the receiving devices controlled by the receiving relays will be teletypewriter printers, perforators, or other suitable receiving devices.

The system shown in Fig. 3 will be recognized as being capable of two-way transmission, either in one direction at a time or in both directions simultaneously. However, in practice the system is generally used for half duplex transmission, one direction at a time, because certain distortions due to line changes become exaggerated in full duplex transmission. Relay 13 will respond to the signals generated by relay 14 and relay 12 will respond to signals generated by relay 16. The terminal A, comprising transmitting relay 14 and receiving relay 12, has been designated as the polar sending terminal because the marking and spacing contacts of the transmitting relay have equal potentials at opposite polarities. The terminal B has been designated as the polar receiving terminal rather than in terms of its transmission attributes, which actually partake of the nature of differential transmission in view of the unsymmetrical pattern of transmitting potentials. It is generally the custom, in providing battery potentials such as those designated as E and E/2, to employ the full office battery voltage, which is frequently 130 volts, as the source having the value E and to obtain values E/2 by potential dividers associated with the batteries or by series connected resistance between the transmitting relay armature and the point of connection to the two windings of the receiving relay.

When transmission is from the polar sending terminal A, the armature of the sending relay at the polar receiving terminal steadily engages the grounded marking contact, and currents flowing in the line for marking and spacing signals are equal and opposite, because the transmitting batteries are of equal magnitude E/2 and opposite in polarity, negative being impressed on the line at the polar sending end for the marking condition and positive for the spacing condition. As is well known, line changes will affect the marking and spacing signal currents equally, and hence will cause no bias.

When transmission is from the polar receiving terminal B, the armature of the sending relay at the polar sending terminal steadily engages the marking contact, which has negative battery of the magnitude E/2. At the polar receiving terminal the marking contact has ground, as previously stated, and the spacing contact has negative potential of magnitude E. This source of potential may be represented as two sources, of magnitude E/2, connected in series-aiding relation as represented in Fig. 5B. The marking polarity, ground, may be represented by two like sources, of any magnitude, connected in series opposition, to produce zero current. For example, it may be assumed to consist of two sources of magnitude E/2, connected as represented in Fig. 5A.

Figure 5A:
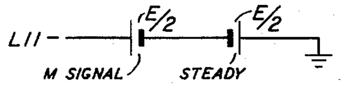
Figure 5B:
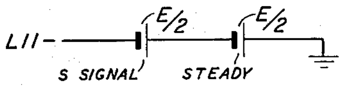

A comparison of Figs. 5A and 5B reveals that the signaling components for marking and spacing signals transmitted from the polar receiving terminal B may be represented as comprising a reversible or polar component of magnitude E/2 in series with an unchanging or steady component of like magnitude. The polar signal component, once isolated and identified, can be disregarded as far as the effect on bias is concerned. The value of this component, however, determines the signal strength. The remaining steady component must have its effect neutralized at the remote terminal. This may be accomplished by adjusting the current through a third or biasing winding of receiving relay 12 by means of variable resistor 18. When the effect of the steady component has been neutralized, the receiving relay 12 will be freely responsive to the polar component of the signal.

As far as the polar signal component is concerned, changes in line resistance will produce no bias, as noted above. The effect of the steady component −E/2 will now be considered. This voltage component −E/2 is opposed by the marking potential −E/2 applied at the polar sending terminal, so that the line current due to the two voltages acting together is zero. Therefore, as is well known from network theory, any change in the line resistance will not affect those currents in any part of the system which are due to the marking voltage −E/2 at the polar sending terminal and the steady voltage −E/2 at the polar receiving terminal. Therefore, no bias will result. This type of polarential transmission is particularly applicable to cable systems, in which line resistance changes appreciably with temperature.

Figure 4:
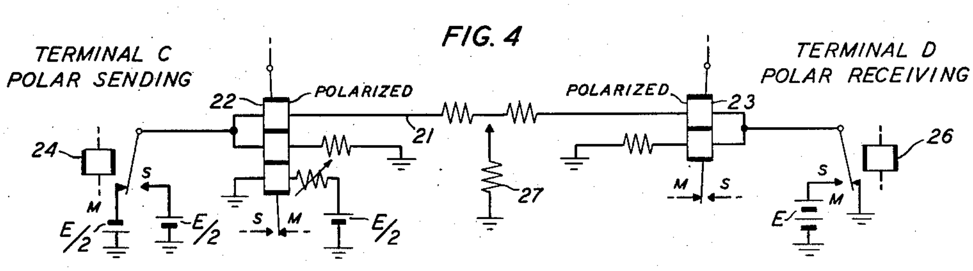

Referring now to Fig. 4, the reference numeral 21 designates a telegraph line connected at its opposite ends through the operating windings of receiving relays 22 and 23 to the armatures of transmitting relays 24 and 26. Relays 22 and 23 correspond to relays 12 and 13 and may be arranged to control the same type of receiving equipment. Relays 24 and 26 correspond to relays 14 and 16 and may be arranged to be controlled by the same type of transmitting equipment. The marking and spacing contacts of transmitting relay 24 have connected thereto transmitting potentials of the same polarities and magnitudes as the transmitting potentials associated with relay 14. Transmitting relay 26, at the polar receiving terminal D, has ground on its marking contact in correspondence with transmitting relay 16 in Fig. 3, but has on its spacing contact a transmitting potential of magnitude E and positive polarity, which is the opposite of that applied to the spacing contact of relay 16. Resistor 27 represents the leakage resistance from line 21 to ground, lumped at the center of the line. The receiving terminals have been designated as polar sending and polar receiving, as in Fig. 3, and have been further designated as terminals C and D, respectively.

Transmission from the polar sending terminal C is exactly the same as it is in the arrangement shown in Fig. 3, because the marking and spacing potentials are of negative and positive polarity, respectively, are of equal magnitude E/2, and the marking contact of relay 26 is grounded. This arrangement is inherently free from bias due to line changes, as mentioned previously.

When transmission is from the polar receiving terminal D, the armature of the sending relay at the polar sending terminal C engages the marking contact which has negative battery of magnitude E/2. At the polar receiving terminal the marking contact has ground, as previously stated, and the spacing contact has positive potential of magnitude E.

Figure 6A:
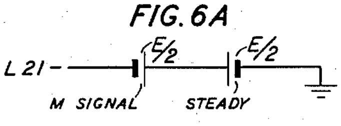
Figure 6B:
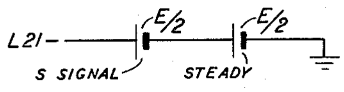

Following the pattern of Fig. 5B, this spacing potential may be represented as two sources of magnitudes E/2 in series-aiding relation, as shown in Fig. 6B. Similarly, the grounded condition of the marking contacts may be represented as in Fig. 6A, by series opposing potentials of magnitude E/2, with the positive terminals interconnected and negative terminals presented to ground and to the line.

A comparison of Figs. 6A and 6B reveals signaling and steady components identical with those of Figs. 5A and 5B except for reversal of all polarities. The windings of relay 22, except the biasing winding must be reversed, by comparison with those of relay 12, corresponding to this reversal of sending battery. The components for marking and spacing signals transmitted from the polar receiving terminal comprise reversible or polar components of magnitude E/2 in series with a steady component of the same magnitude. The potential that is effective to transmit signals has a magnitude E/2. As in the case of Figs. 3, 5A and 5B, the steady component must be neutralized by adjusting the biasing current through the third winding of receiving relay 22. As in the previous discussion, the polar signal voltage, considered by itself, will produce no bias as a result of line changes.

The effect of the steady voltages +E/2 at the polar receiving terminal and −E/2 at the polar sending terminal may be explained as follows. The potential gradient along the line due to these voltages varies from +E/2 at terminal D to −E/2 at terminal C, passing through zero at the center of the line. A lumped leakage to ground at this point, such as resistance 27, will produce no leakage current and hence no bias in the signals received at C. Leakage between the point of zero steady potential and terminal C will tend to produce bias of one sign while leakage on the line section between the point of zero steady potential and terminal D will tend to produce bias of the opposite sign. When leakage occurs throughout this line, the leakage on one side of the zero potential point produces a biasing influence which opposes that produced in the line section on the other side of the zero potential point. The line potential gradient can be adjusted so that these opposing tendencies are closely balanced and the resulting bias will be near zero. This type of polarential transmission is applicable particularly to open wire lines, which are not subject to significant line resistance fluctuation, but are subject to wide variations in leakage resistance to ground, mainly due to varying atmospheric conditions, particularly with regard to the moisture content of the air.

As previously stated, the present invention is concerned with improvements in the two types of polarential transmission systems shown in Figs. 3 and 4, and those improvements are contained in the schematic circuit diagrams designated Figs. 1 and 2, which correspond in type to Figs. 3 and 4, respectively.

In Fig. 1, a telegraph transmission channel 31 is connected at its ends through operating windings of polarized receiving relays 32 and 33 to the armature of transmitting relays 34 and 36, respectively. The marking and spacing contacts of transmitting relay 34 are connected to sources of potential of negative and positive polarity, respectively, at full magnitude E which, as previously stated, may be the full potential of the telegraph transmission battery in the telegraph office. As in the case of the receiving relays 12 and 22 in Figs. 3 and 4, respectively, there is a connection to ground through a second winding of relay 32 from the armature of transmitting relay 34 to prevent relay 32 from responding to signals generated by relay 34 while permitting it to respond to signals generated by relay 36. The armature of relay 36 is connected through a second winding of relay 33 to ground for a similar purpose.

The spacing contact of transmitting relay 36 has a transmitting potential connected thereto which is of the same polarity and magnitude as that applied to the spacing contact of transmitting relay 16 in Fig. 3. The marking contact, however, instead of having ground, like the arrangement in Fig. 3, has transmitting potential of positive polarity, the opposite of that on the spacing contact, and of the full magnitude E.

The arrangement shown in Fig. 1 further differs from that shown in Fig. 3 in the provision of a second or neutralizing line 37 paralleling and adjacent to the line 31 and having its ends connected through neutralizing windings of relays 32 and 33 to battery and ground, the battery being located at the polar receiving terminal F and being of the same polarity and magnitude E as the battery on the marking contact of transmitting relay 36 at that terminal, and the ground being connected at the opposite end. In addition, there are connections from line 37 through another winding of each of the receiving relays 32 and 33 to ground. These connections are comparable with the connections from line 31 through the second winding of each of the relays 32 and 33 to ground and insure a complete match between line 31 and its terminations and line 37 and its terminations. The windings connected to line 37 are oppositely poled to those connected to line 31, so that interference induced in both lines by common sources, such as ground potential or power line induction is substantially neutralized in the receiving relays at both terminals. Finally, the relay 32 is provided with a biasing winding having a battery connection through a variable resistor 35 to provide a fixed but adjustable flow of current through that winding to oppose and nullify the spacing influence upon relay 32 of current in line 37 resulting from the battery connected to that line at the remote terminal. In conformity with the designation of polar sending and receiving terminals in Fig. 3, the terminal E comprising transmitting relay 34 and receiving relay 32 in Fig. 1 has been designated as the polar sending terminal and the terminal F containing sending relay 36 and receiving relay 33 has been designated as the polar receiving terminal. Resistors 38 and 39 represent in lumped form, the resistance of lines 31 and 37, respectively.

Referring now to Fig. 2, the reference numeral 41 designates a line having its ends connected through the operating windings of receiving relays 42 and 43 to the armatures of sending relays 44 and 46, respectively. The neutralizing line 47 also traverses windings of relays 42 and 43 and terminates in battery at the polar receiving terminal H and in ground at the polar sending terminal G. The marking and spacing contacts for polar sending relay 44 have negative and positive transmitting potentials, respectively, the same as transmitting relay 34 in Fig. 1 and of the same magnitude E. The transmitting potentials on the marking and spacing contacts of sending relay 46 are of magnitude E, the same as those applied to the marking and spacing contacts of transmitting relay 36 in Fig. 1 but the polarities are reversed, the marking contact having negative polarity and the spacing contact having positive polarity. Because of the reversal of polarity on the marking contact, the polarity of the battery connected to neutralizing line 47 is also reversed, the negative terminal being connected to line 47 and the positive terminal being grounded. Other connections from the line 47 to ground through windings of relays 42 and 43 are like those of line 37 in Fig. 3. Relay 42 also has a biasing winding supplied with current from battery through a variable resistor 45. Because of the reversal of the batteries at terminal H the windings of relay 42 except the biasing winding, are reversed in comparison with those of relay 32.

Comparing Fig. 1 with Fig. 3, and Fig. 2 with Fig. 4, it will be seen that three significant differences appear. They are:

1. The marking and spacing potentials at the polar sending terminal have been increased in magnitude from E/2 to E.

2. A marking potential source opposite in polarity to the spacing potential source has been connected between ground and the marking contact of the transmitting relay at the polar receiving terminal.

3. A neutralizing line has been connected to windings of the two receiving relays, and a compensating potential source, of magnitude E, has been inserted in the neutralizing line at the polar receiving terminal, the potential source having the same polarity connections to the line and ground as the marking transmitting potential at that terminal.

Viewed from the polar receiving terminal, the potential source applied to the transmitting relay armature at the spacing contact of relay 36 in Fig. 1, and thus to line 31, is of negative polarity and of magnitude E, with the positive terminal of the potential source grounded. The potential source applied to line 37 is of opposite polarity and the same magnitude. These potentials may be represented as comprised of two components, of magnitude E/2, in series-aiding relation. This analysis may in turn give rise to a graphical representation as shown in Fig. 7B, in which the components are connected in accordance with the specified relationships. In the marking condition of the transmitting relay 36 at the polar receiving terminal F, line 31 is terminated through the armature of the sending relay and positive potential of magnitude E to ground, and line 37 remains terminated through positive potential of magnitude E to ground. Since the terminating potentials for the two lines are, in this case, of like polarity and equal magnitudes, the source potential could be common, and may be so shown in preparing a diagram of voltage components for the marking condition. Thus it is that in Fig. 7A there is a common source of magnitude E for the two lines. Following the practice observed in Figs. 5A and 6A, wherein an absence of a source of potential was represented by series opposing potentials of magnitude E/2, each of the two lines may be assumed to include in addition to the positively poled source of potential of magnitude E, now represented as common, a pair of oppositely poled sources of potential of E/2, and they have been included in Fig. 7A.

Figure 7A:
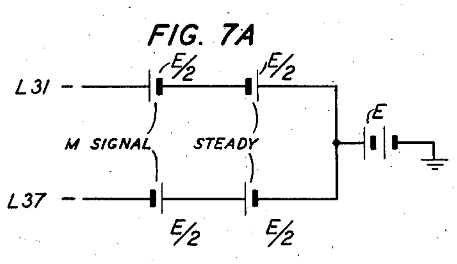
Figure 7B:
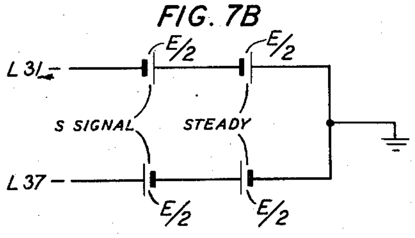
Figure 8A:
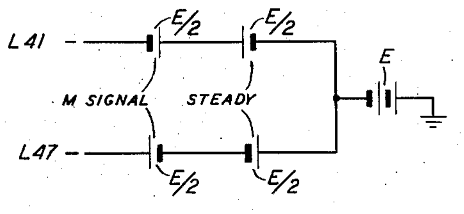
Figure 8B:
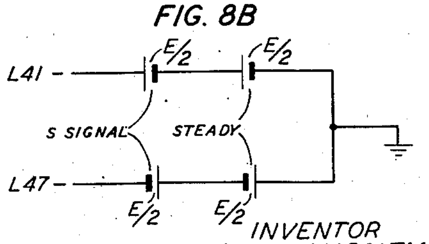

A comparison of Figs. 7A and 7B reveals that line 31 has, for each condition (marking and spacing) an identically poled voltage component of magnitude E/2 and line 37 likewise has, for each of the two conditions, an identically poled component of magnitude E/2. These have been designated as the steady components, since they are the same for the two signaling conditions. The signaling components for marking and spacing signals transmitted from the polar receiving terminal F may be considered as comprising a reversible or polar component of magnitude E/2 in each of the two lines and of opposite sign from one line to the other. The significance of the reversible or polar components of magnitude E/2 in each of the two lines 31 and 37 in Fig. 1 is that, since their relationship is series aiding, they add to provide a total polar signaling potential of magnitude E which is divided between the transmission line and the neutralizing line, but is as fully effective for signal transmission purposes as a polar signaling component of magnitude E would be if it could be achieved in the single line arrangement shown in Fig. 3, the actual signaling components of which are represented in Figs. 5A and 5B. This doubling of the polar signaling component provides for reliable transmission over longer telegraph lines with existing telegraph office batteries, and has been achieved by utilizing fully the voltages available at the existing telegraph batteries, but without adding to those already in use or connecting to any transmitting contact more than one such battery.

The steady components that appear at magnitude E/2 in each of the two lines 31 and 37, by virtue of being of opposite polarity are also series aiding and add magnetically in relay 32. The current through the biasing winding of relay 32 must be adjusted to nullify the magnetic effects produced by the steady potential E/2 in each of the two lines. The component E that is common to the two lines in the marking condition, as shown in Fig. 7A but that is absent in the spacing condition shown in Fig. 7B, causes current to flow in the two lines in the same direction, and if the lines are alike and properly balanced, the magnetic effects produced by the longitudinal current in the terminal relay windings will be equal and opposite and will be self-neutralizing.

Fig. 2 differs from Fig. 1 in that all battery polarities at the polar receiving terminal H, including the polarity of the battery in line 47, are reversed. They retain the magnitude E. It follows from this that Figs. 8A and 8B have the same configurations as Figs. 7A and 7B, respectively, and the several voltage components have the same magnitudes, but in every instance the polarity of the component is reversed. The steady component in each of lines 41 and 47 is E/2. The polar signaling component is E/2 in each line and in series-aiding relation in the two lines so that the effect is the same as if a polar signaling potential of magnitude E could be attached in the single line arrangement shown in Fig. 4. It follows from this that the available signaling potentials are utilized to the same degree of efficiency in the arrangement shown in Fig. 2 as they are in the arrangement shown in Fig. 1, and the degree of utilization of the potentials of the available signaling potentials in the latter arrangement has been fully described.

It remains to be demonstrated that the arrangement shown in Fig. 1 is self-compensating for changes in line resistances and that the arrangement in Fig. 2 is self-compensating for changes in line leakage resistance, and that, accordingly, they are true polarential systems and are modifications of the polarential systems shown in Figs. 3 and 4, respectively.

Referring first to Fig. 1, and observing that the marking and spacing potentials on transmitting relay 36 are positive and negative battery, respectively, each of magnitude E, the average potential applied to the polar receiving terminal of line 33 during transmission is ground or zero potential. During transmission from terminal F to terminal E, the line terminates at terminal E in battery magnitude —E. This produces a potential gradient ranging from ground to —E. At the same time, line 37, having positive battery at terminal F and ground at terminal E, has a potential gradient ranging from magnitude +E to ground in the same direction. These are parallel and descending gradients, as expressed above, and produce equal currents in the same direction in the two lines, but these currents oppose each other magnetically in the windings of receiving relay 32 at terminal E. Changes in line resistance affecting both lines alike, as they do, do not disturb the balance between the two steady line currents, and hence do not cause bias. Whereas, in the single line system in Fig. 3 the average current is zero, so that changing resistance of the line does not produce bias, in the corresponding two-wire arrangement, the average current in line 31 is not zero, but the total magnetic effect of that current and the current in line 37 is zero, so that equal changes in resistance in the two lines do not produce bias in the signals.

Referring now to the two-wire arrangement shown in Fig. 2, the transmitting potentials at the polar receiving terminal H are +E and —E, and the average potential is ground or zero. The terminal potential at the polar transmitting terminal G, during transmission to that terminal, is —E. The potential gradient along line 41 from the average potential at terminal H to terminal G has a range from ground to —E. Line 47 has a gradient ranging from —E to ground in the same direction. Accordingly, the two gradients have equal and opposite slopes and are symmetrical about a value —E/2.

Balanced concentrated leakage at the center of both lines, such as resistances 48 and 49, will cause equal disturbing currents in the two lines which being in the same direction will neutralize each other in the windings of relay 42. For balanced leakage between the centers of the two lines and terminal G, disturbing currents produced in line 41 will predominate, while for leakage between the center of the two lines and terminal H, disturbing currents produced in line 47 will predominate. When leakage occurs throughout the lines, the leakage on one side of the crossover point of steady potential produces a net biasing influence which opposes that produced in the line sections on the other side of the cross-over point. The line potential gradients can be adjusted so that these opposing tendencies are closely balanced and the resulting bias will be near zero. Whereas in the single line system, Fig. 4, the average potential is zero, so that line leakage does not produce bias, in the corresponding two-wire arrangement the average potentials of the two lines are not zero but are equal so that disturbing currents produced by leakage oppose each other and produce no bias.

Although specific embodiments of the invention have been shown in the drawings and described in the foregoing specification, it will be understood that the invention is not limited to such specific embodiments but is capable of modification and rearrangement, and substitution of parts and elements as well as changes in specified values of components without departing from the spirit of the invention.

What is claimed is:

1. In a telegraph system, a telegraph line comprising a single conductor, a multiwinding receiving relay at each end of said conductor and each relay having one terminal of one winding connected to an end of said conductor, a sending relay local to each of said receiving relays and having a transfer contact member normally engageable with one of two voltage sources of opposite polarities and connected to the other terminal of said one winding of the respective receiving relays, a conductive path from each of said transfer contacts through another winding of the associated receiving relay for generating a magnetic field to render each receiving relay insensitive to excursions of the local transmitting relay transfer contacts, a second single conductor paralleling the first and having its ends connected to a terminal of another winding of each of said receiving relays, a grounded voltage source connected to the other terminal of one of said other windings, a ground connection to the other terminal of the other of said other windings to provide a flow of compensating current through said interconnected second single conductor and windings, and a biasing circuit comprising a source of potential and still another winding of one of said receiving relays to provide a magnetic field to oppose and nullify the field produced by the compensating current through the recited winding of the same receiving relay.

2. In a telegraph system comprising a transmission conductor traversing line windings of receiving relays at the ends thereof and terminating in commutating transmitting members arranged to engage marking and spacing contacts having potentials of equal magnitude and opposite polarity applied thereto at one end of said conductor and having a potential of the same magnitude applied to the marking contact at the other end of said conductor, a compensating conductor physically paralleling said transmission conductor and connected to other windings of said relays, a source of potential in the circuit of said neutralizing conductor at said other end of said transmitting conductor of a polarity and magnitude to influence thereceiving relay at said other end in like manner as would elimination of said neutralizing conductor and substitution of ground for the potential connected to the marking contact at said other end of said transmitting conductor, whereby in one position of the commutating member at said one end of said transmission conductor substantially twice the current flows in said transmission conductor relative to that obtainable with the marking contact at said other end grounded, and means associated with the receiving relay at said one end of said transmission conductor for counteracting the effect on that relay of the current in said neutralizing conductor.

3. A telegraph system according to claim 2 having applied to the spacing contact at said other end of the transmission conductor a potential equal in magnitude and opposite in polarity to that applied to the marking contact at the same end.

4. A telegraph system according to claim 2 wherein the source of potential in said neutralizing conductor is of the same magnitude as the potential applied to the marking contact at said other end of said transmission conductor.

5. A system in accordance with claim 2 in which there is also provided a first winding on each of said receiving relays having one terminal thereof connected to said transmission conductor and the other terminal thereof connected to ground, a second winding on each of said receiving relays having one terminal thereof connected to said compensating conductor and the other terminal thereof connected to ground, said first and second windings providing a complete match between said transmission conductor and its terminations and said compensating conductor and its terminations, and being oppositely poled so that interference induced in both lines by common sources is substantially neutralized in the receiving relays.

6. An improved polarential telegraph transmission system comprising a first station, a second station, a transmission channel extending between said stations, a neutralizing channel extending between said stations, a multiwinding receiving relay at each of said stations, two oppositely polarized voltage sources of equal magnitudes at said stations, a commutating transfer member terminating the transmission channel at each station, a first winding on each of said receiving relays in serial relation with said transmission channel, the commutating transfer member under normal condition engaging the voltage source of one polarity and under off-normal condition engaging an equal voltage source of opposite polarity at said first station, the other commutating transfer member under corresponding conditions engaging voltage sources at said second station of the same magnitude and opposite polarities of those at said first station, said neutralizing channel terminating at said first station in ground and at said second station in a voltage source of the same magnitude and polarity as that engaged by the transfer member thereat in its normal condition, a second winding on each of said receiving relays in serial relation with said neutralizing channel, a third winding on each of said receiving relays having one terminal thereof connected to ground and the other terminal thereof connected to said transmission channel, a fourth winding on each of said receiving relays having one terminal thereof connected to ground and the other terminal thereof connected to said neutralizing channel, a fifth winding on the receiving relay at said first station having connection to a voltage source to counteract the fourth winding of said relay, said voltage sources and relay winding connections providing on said neutralizing channel self-compensation for line changes, and on said transmission channel the full voltage of said voltage sources at said first and second stations, to effect a maximum transmission signal strength.

7. A system in accordance with claim 6 in which the commutating member at said second station engages in conditions corresponding to the commutating member at said first station voltage sources of the same magnitude and polarity.

References Cited in the file of this patent

UNITED STATES PATENTS 2,133,832 Pullis ---------------- Oct. 18, 1938